United States Patent [19]

Rutz

[11] 4,070,831
[45] Jan. 31, 1978

[54] HYDRAULIC DRIVE CIRCUIT FOR MACHINE TOOLS

[75] Inventor: Leon E. Rutz, Lake City, Minn.

[73] Assignee: Houdaille Industries, Inc., Buffalo, N.Y.

[21] Appl. No.: 757,654

[22] Filed: Jan. 7, 1977

[51] Int. Cl.² .......................... F15B 1/02; F15B 15/18
[52] U.S. Cl. ...................................... 60/371; 60/413; 91/218; 91/220
[58] Field of Search ................. 60/369, 371, 380, 413, 60/414; 91/218, 248, 249, 275, 303, 390, 220

[56] References Cited

U.S. PATENT DOCUMENTS

| | | | |
|---|---|---|---|
| 3,818,799 | 6/1974 | Hague | 91/248 X |
| 3,913,450 | 10/1975 | MacGregor | 91/390 |
| 3,963,039 | 6/1976 | Coeurderoy | 60/413 X |

Primary Examiner—Edgar W. Geoghegan
Attorney, Agent, or Firm—Hill, Gross, Simpson, Van Santen, Steadman, Chiara & Simpson

[57] ABSTRACT

A hydraulic drive circuit for machine tools, such as power shears, press brakes, and the like having hydraulic cylinder reciprocated members, controls fluid flow to and from the hydraulic cylinders to automatically move and hold the member in an idle position, to apply power in the desired direction upon demand, and to bypass fluid for unloading the pump until power is demanded. In power shears and press brakes, the vertically movable ram is automatically raised and held in an out-of-the-way position whenever the manually actuated control is released even after stoppage of the pump.

15 Claims, 14 Drawing Figures

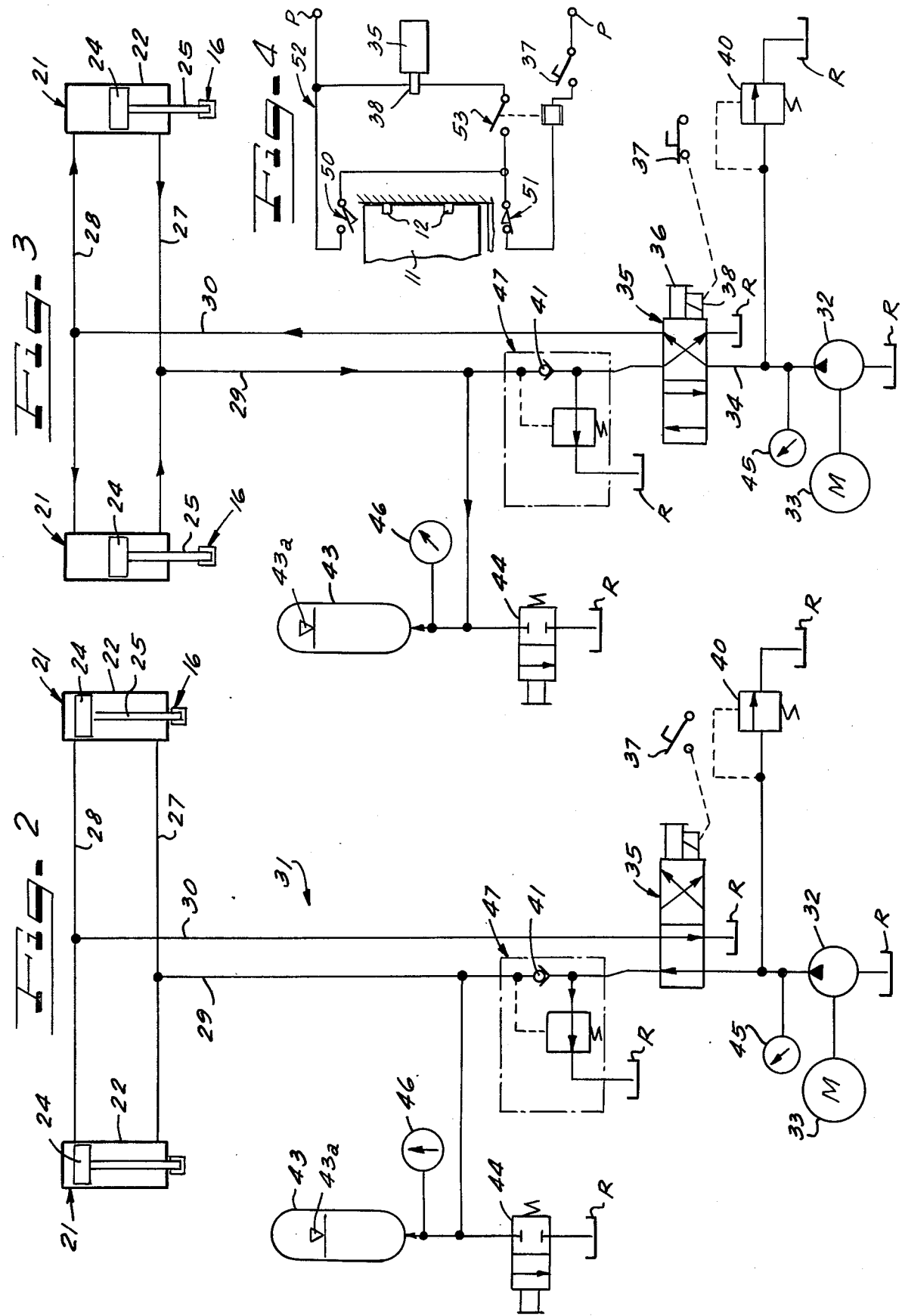

HYDRAULIC DRIVE CIRCUIT FOR MACHINE TOOLS

FIELD OF THE INVENTION

This invention relates to the art of hydraulic drives for machine tools and deals particularly with a hydraulic circuit arrangement that provides instant power for driving hydraulic cylinders in opposite directions, unloads the pump during idle periods, holds the driven machine tool member in an out-of-the way fixed position between power strokes and eliminates hydraulic shock by providing a control valve which does not have a closed position.

SUMMARY OF THIS INVENTION

According to this invention, power rams for actuating machine tool elements, such as the reciprocating blades and dies of power shears and press brakes, are selectively driven in opposite directions by fluid in a controlled circuit or system having a pump, a reversing valve which is never closed, and an accumulator charged from the pump to a minimum pressure and receiving additional fluid to increase the pressure on the power stroke, an unloading valve freely bypassing fluid from the pump whenever the accumulator pressure exceeds the predetermined minimum, a manually operated dump valve for the accumulator and a safety release valve for the pump. The arrangement is such that fluid from the pump flows in one direction through the reversing valve to drive the pistons of the hydraulic cylinder in one direction to the ends of their strokes and at the same time to charge the accumulator. A check valve then holds the pistons of the cylinders in fixed position and accumulator pressure opens a bypass valve so that fluid from the pump recirculates freely. Then when the reversing valve is actuated to drive the pistons of the cylinders in a power applying direction, fluid will flow to the opposite ends of the cylinders while the fluid in the cylinders on the opposite sides of the piston will drain under the back pressure of the accumulator. In this manner, the system is not subjective to hydraulic shock because the reversing valve is always in a flow through condition, and is biased to a position for draining the tops of the cylinders so that the accumulator holds the pistons to maintain the machine tool element in a lifted fixed idle position, and will raise this element to this lifted idle position until the reversing valve is manually reversed to deliver the power stroke. The pump is unloaded as long as the accumulator is sufficiently loaded to hold the machine tool element in the idle position and this position is maintained by a check valve even after the pump is stopped.

It is then an object of this invention to provide a fluid drive for power ram actuated machines which returns the driven part to an idle position after each power stroke holds the driven part in the idle position even after cessation of the fluid driving pump, and has an operating valve which is always in a fluid flow through condition to prevent hydraulic shock.

Another object of the invention is to provide a hydraulic drive for cylinder operated reciprocating machine tool elements which responds quickly to manual actuation for power delivery, automatically returns the reciprocating element to an idle position, holds it in the idle position until the next manual actuation of the valve, and unloads the fluid pump between manual actuations of the valve.

A further object of the invention is to provide a hydraulic drive system for a twin cylinder actuated reciprocating ram in a power shear or press brake in which a fixed fluid displacement pump supplies fluid to and drains fluid from opposite ends of the cylinder under control of a manually actuated reversing valve, charges an accumulator to hold the cylinders in an idle position, and bypasses fluid from the pump between power strokes of the cylinders.

A specific object of the invention is to provide a hydraulic drive system for twin cylinder actuated power shears which is instantly responsive to a manually actuated valve, holds the power shear in an idle position, and unloads the pump between power strokes of the shears.

Other and further objects of this invention will become apparent to those skilled in this art from the following detailed description of the annexed sheets of drawings which, by way of a preferred example only, illustrate one embodiment of the invention.

ON THE DRAWINGS

FIG. 2 is a diagrammatic view of the circuit of FIG. 1 including diagrammatic illustration of the twin cylinders but showing the components in position for unloading the pump after the pistons in the cylinders have reached the tops of their strokes;

FIG. 3 is a view similar to FIG. 2 but showing the components in position to deliver fluid for the power or downstroke of the pistons and also illustrating the manner in which the fluid under the pistons flows into the accumulator to accomodate the downstroke of the pistons.

FIG. 4 is a circuit diagram showing limit switches tripped by the shear blade carrier and a relay to cycle blade operation.

AS SHOWN ON THE DRAWINGS

Figure 1:
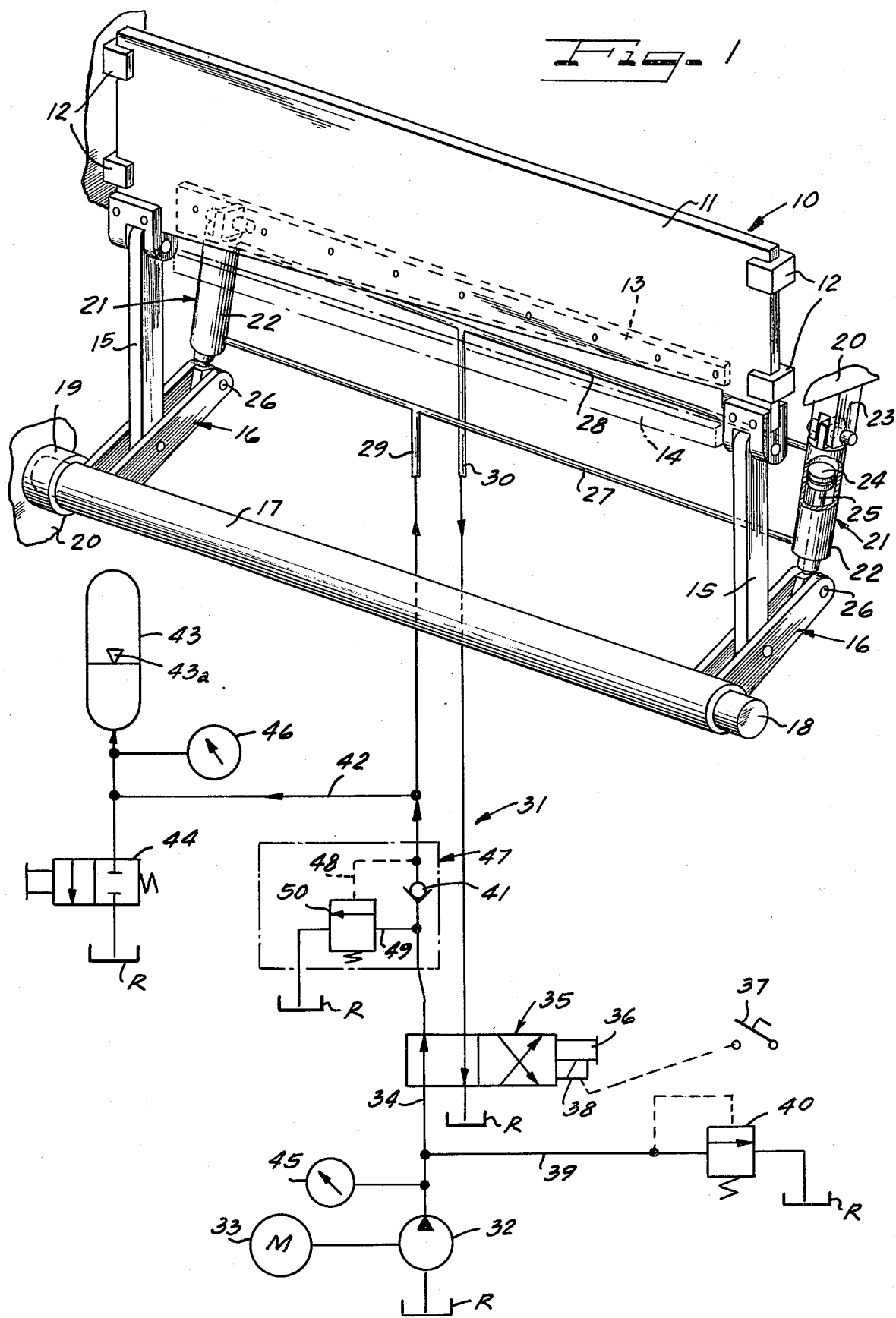
FIG. 1 is fragmentary perspective view of a twin cylinder actuated power shear and including a diagrammatic showing of the hydraulic drive circuit of this invention for the twin cylinders with the components in position to supply fluid under pressure to the bottoms of the cylinders for raising the shear blade.

In FIG. 1 the reference numeral 10 illustrates generally a twin cylinder driven power shear having an upstanding ram plate 11 slidably mounted in guides 12 and carrying, along its bottom edge thereof, the movable shear blade 13 for cooperating with the underlying stationary shear blade 14. Links 15 pivotally suspended from the ends of the ram or blade carrier 11 are pivotally connected to the midpoints of levers 16 integrally secured to the ends of a torsion rod 17 and extending laterally therefrom. The torsion rod 17 has reduced diameter ends 18 beyond the levers 16 which are rotatably mounted in bearing bushings 19 mounted on the frame 20 of the power shear.

The movable blade carrying ram 11 is reciprocated by twin power ram or hydraulic cylinders 21 each having a cylindrical housing 22 pivotally suspended at its upper end from a machine frame carried bracket 23 and housing a piston 24 with a depending piston rod 25 projecting through the lower end of the cylinder and pivoted at 26 to the end of the adjacent lever arms 16.

A fluid conveying conduit 27 communicates with the bottoms of the cylinders 22 under the pistons 24 while a similar conduit 28 communicates with the tops of the cylinders above the pistons 24. The conduit 27 is supplied from a tube or pipe 29 while the conduit 28 is served by a pipe 30 forming part of the hydraulic circuit of this invention.

It will be understood that when fluid is supplied from the conduit 27 under the pistons 24 in the cylinders 22, the fluid above the piston will be drained through the conduit 28 and the pistons will be driven upwardly in their cylinders to rotate the torsion bar 17 and lift the links 15 thereby spacing the movable blade 13 above the stationary blade 14. Conversely, on the power stroke or cutting stroke of the shear 10, fluid from the conduit 28 forces the pistons 24 downwardly in their cylinders while the fluid under the pistons is drained through the conduit 27. On this power stroke, the torsion bar 17 will be reversely rotated with the levers 16 swinging downwardly to pull the links 15 lowering the blade 13 past the stationary blade 14 to effect a cutting or shearing of the workpiece inserted between the blades. A torsion bar ties the twin cylinders 21 together so that one will not run ahead of the other in the event of local stressing due to the rake angle of the movable blade 13 effecting a progressive cutting of the workpiece across the width thereof and also due to local cutting of narrow workpieces where only local portions of the blades engage the workpiece.

In accordance with this invention, a hydraulic circuit designated generally by the reference numeral 31 controls fluid flow to and from the power rams or cylinders 21. As shown in FIGS. 1 to 3, this circuit 31 includes a fixed displacement pump 32 driven by an electric motor 33 pumping hydraulic fluid such as oil from a reservoir R through a conduit 34 to a reversing valve 35 which can be manually operated by a push button 36 or remotely operated from a foot pedal 37 controlling a spring biased solenoid 38 which holds the valve in the flow through position of FIG. 1 until electrically actuated. A branch conduit 39 between the pump 32 and the reversing valve 35 discharges to the reservoir R through a safety relief valve 40 loaded at a desired maximum operating pressure and opening whenever pressure in the conduit 39 exceeds this preset maximum.

The reversing valve, in the position of FIG. 1 connects the conduit 34 with the pipeline or tubing 29 to supply fluid through the conduit 27 to the bottoms of the cylinders 22 and connects the pipeline 30 with the reservoir R so that the pistons 24 will be raised and the fluid above the pistons will be drained to the reservoir. A check valve 41 is provided in the pipeline 29 to prevent back flow to the valve 35 and a branch conduit 42 downstream from the check valve 41 connects the pipe 29 with an accumulator 43 and a manually actuated dump valve 44. The accumulator is loaded by a diaphragm 43a, a piston or the like to a preset back pressure. A pressure gage 45 communicates with the conduit 34 for a pressure reading of fluid discharged by the pump 32. A similar pressure gage 46 is provided in the conduit 42 for a pressure reading of the accumulator pressure.

A sequence unloading valve 47 actuated by pressure in the pipeline 29 upstream from the check valve 41 is biased to unload the pump and flow the pump discharge to the reservoir R whenever the accumulator pressure exceeds a predetermined maximum. As shown, this valve 47 has a bleed line 48 tapped into the pipe 29 upstream from the check valve 41 and a bypass line 49 tapped into the pipe 29 below the check valve 41 with a spring loaded valve 50 controlling the bypass and opening only when the accumulator pressure exceeds the predetermined maximum.

In the position of FIG. 1, the pistons 24 are being raised to lift the blade carrying ram 11.

When the pistons 24 reach the tops of their strokes as shown in FIG. 2, continued operation of the pump 32 will flow fluid into the accumulator 43 raising the fluid pressure as indicated by a comparison of the gage positions in FIGS. 1 and 2. When the desired maximum accumulator pressure has been reached, the sequencing valve 47 will open and the pump discharge will be freely recirculated to the reservoir R.

The reversing valve 35 is normally biased to the position of FIGS. 1 and 2 so that in the absence of manual or solenoid power input to the valve the pistons 24 will always be raised to their top positions of FIG. 2 and held there by the fluid under pressure from the accumulator 43. Continued driving of the pump, however, will merely recirculate the fluid from and to the reservoir R. Stoppage of the pump 32 will not result in a lowering of the pistons 24 since the check valve 41 in the pipeline 29 prevents drainage of the fluid from under the pistons 24 and the fluid is maintained under pressure of the accumulator 43 which can continue to force the fluid into the cylinders 22 under the pistons 24 in the event of leakage. Therefore, the blade carrying ram 11 will be automatically raised to its out-of-the-way idle position with its blade 13 spaced above the fixed blade 14 and it will be held there even though the motor 33 is stopped.

As shown in FIG. 3, when the reversing valve 35 is energized as by manual pushing of the button 36 or depressing of the foot pedal 37 to energize the solenoid 38, fluid from the pump 32 will be forced through the conduit 34 into the pipeline 30 and through the conduit 28 into the cylinders 22 above the pistons 24. This will force the pistons downward and fluid under the pistons will flow through the conduit 27 and pipeline 29 back into the accumulator 43 raising the accumulator pressure as shown by the gage 46 above the pressure as shown in FIG. 2. This added pressure, of course, will maintain the sequence unloading valve 47 in the opened position of FIG. 2 and when the pistons 24 reach the bottoms of their strokes, to prevent further flow of hydraulic fluid into the tops of the cylinders 22, continued fluid flow from the pump 32 will build up a fluid pressure sufficient to open the relief valve 40 thereby discharging this fluid to the reservoir R.

The pump 32 is preferably a gear pump capable of developing high pressures and in operation the accumulator 43 may be set to maintain a minimum of 500 pounds per square inch pressure in the pipeline 29 supplying the bottoms of the cylinders 22 and with the reversing valve 35 normally biased to the flow through position of FIGS. 1 and 2, the pistons 24 in the cylinders will be raised to the tops of their strokes by pressured fluid from the accumulator even though the pump 32 is idle. During the lifting stroke of the pistons 24 the accumulator pressure may drop whereupon the fluid from the pump 32 will flow through the conduit 34 opening the check valve 41 to build up the pump pressure in the accumulator. In these circumstances, the bottoms of the pistons 24 in the cylinders 22 are always subjected to a minimum pressure of 500 pounds per square inch.

When the reversing valve 35 is shifted from the position of FIGS. 1 and 2 to the position of FIG. 3 as by manual actuation of the push button 36 or depressing of the foot pedal 37 to actuate the solenoid 38, the pipeline 30 and conduit 28 receive fluid from the pump to discharge into the tops of the cylinders 32 and force the pistons 24 downwardly against the 500 pounds per square inch fluid pressure under the pistons. The pump pressure will quickly build up to the setting of the relief valve 40, which, for example, may be set to open at 2,000 pounds per square inch. Thus, even though the pump 32 continues to discharge fluid after the pistons 24 have reached the bottoms of their strokes, or after a jamming load is encountered by the blade carrier or ram 11, this fluid will be released to the reservoir R. Just as soon as the push button 36 or the foot pedal 37 is released the valve 35 will move back to its position of FIGS. 1 and 2 to relieve the fluid from the tops of the pistons and introduce fluid beneath the pistons for raising the cylinder-operated blade carrier or ram 11 to its idle position with the fluid above the pistons draining back to the reservoir. If it is desired to unload the system and lower the ram 11, the dump valve 44 may be manually actuated to discharge fluid from the accumulator 43 allowing it to drain to the reservoir.

While the diagrammatic showings of FIGS. 1 through 3 include a plurality of symbolic reservoirs "R," it should be understood that a single tank is provided to supply the hydraulic fluid to the pump 32 and to receive the fluid from the reversing valve 35, the sequence unloading valve 47, the relief valve 40 and the dump valve 44. It will also be understood that fluid always flows through the reversing valve 35 either in the directions of FIGS. 1 and 2 or in the directions of FIG. 3. Therefore the system is not subjected to hydraulic shock such as occurs when flow of fluid under pressure is alternately stopped and released by shut-off valves.

As shown in FIG. 4, top and bottom limit switches 50 and 51 are positioned to be tripped by the ram 11 at the top and bottom of its stroke. These switches can be positioned to determine the length of the ram stroke 11 and are part of an electrical circuit 52 including the foot pedal 37, the solenoid 38 for the reversing valve 35 and a relay switch 53. Current is supplied from a power source P and the circuit arrangement is such that when the foot pedal 37 is depressed, to initiate a power stroke of the ram or blade carrier 11, the bottom switch 51 is in its normally closed position and the top switch 50 is held closed by the ram 11 being at the top of its stroke. Current then flows to actuate the solenoid and also close the relay 53. The solenoid 38 will be energized to bring the reversing valve 35 to the position of FIG. 3 and fluid will flow to the tops of the cylinders 22 and be drained from the bottoms of the cylinders to force the ram 11 downwardly through its power stroke.

The switch 51 is normally closed but will be tripped by the blade carrier 11 to an open position at the bottom of the stroke of the carrier 11 and even though the foot pedal 37 remains closed, the normally closed switch 51 will be open to deenergize the solenoid 38 allowing the reversing valve 35 to return to the position of FIG. 1 for reversing flow to raise the ram 11. As ram 11 reaches the top of its stroke, it closes the normally open switch 50 to again energize the solenoid 38 and again reverse the valve 35 back to its FIG. 3 position causing blade carrier to cycle through another power stroke. Thus, if the pedal 37 is kept in a depressed closed condition, the shear blade will continue to cycle through raising and power strokes. When the foot pedal 37 is released, however, the ram 11 will automatically return to its raised position.

The switch 51 can be positioned to automatically release the solenoid 38 of the reversing valve 35 just before the pistons 24 reach the bottoms of their cylinders 22 for reversing fluid flow to raise the pistons even though the foot pedal is not released, thereby avoiding piston impact in the cylinders and insuring automatic raising of the ram 11. This switch 51 thereby controls the lowermost position of the ram.

The switch 50 is normally open but is closed by the ram at the top of its stroke and may be positioned to prevent impacting of the pistons against the tops of the cylinders. This switch 50, therefore, determines the height to which the ram 11 is raised.

From the above description, it will therefore be understood that this invention provides a hydraulic drive system for machine tools and the like and is especially suited for driving reciprocating blade and die carriers in power shears and press brakes to have an instant response to deliver power strokes and to raise and hold the driven machine tool element in an out of the way position between power strokes.

I claim:

1. A fluid drive for double acting piston and cylinder power rams which comprises conduits supplying and draining fluid from opposite ends of the ram cylinder on opposite sides of the piston therein to alternately drive the piston to opposite ends of the cylinder, a pump supplying fluid to said conduits, a reservoir receiving fluid from said conduits, a reversing valve controlling the direction of flow of fluid through the conduits, an accumulator communicating with one of the conduits to maintain a predetermined fluid pressure therein, a sequence unloading valve in said one conduit unloading the pump whenever fluid pressure in the conduit is above a predetermined maximum controlled by said accumulator, a relief valve set to open at a higher pressure than said sequence unloading valve communicating with the pump discharge, a dump valve for said accumulator, and means biasing said reversing valve to flow fluid through the conduits for holding the piston in the power ram at one end of its stroke until the reversing valve is actuated against the bias to flow fluid for driving the piston to the other end of its stroke to deliver power.

2. In a machine tool having a twin cylinder actuated member with each cylinder having a piston linked to the member to raise the member to an idle position and to drive the member downwardly through a power stroke, the improvement which comprises a hydraulic circuit for said twin cylinders including conduits supplying fluid to opposite ends of each cylinder to raise and lower the pistons, a reversing valve controlling the direction of flow of the fluid through the conduits, a positive displacement pump supplying fluid through the reversing valve to the conduits, a relief valve for said pump, an accumulator communicating with a conduit for raising the pistons, a sequence unloading valve controlled by accumulator pressure to unload the pump below a maximum pressure, a dump valve for said accumulator, and means biasing said reversing valve to a position for flowing fluid from the pump to the accumulator and to the bottoms of the cylinders for raising the pistons, and manually actuated means for shifting the reversing valve against the bias to flow fluid to the tops of the pistons and deliver a power stroke to the member whereby the member will normally be raised and held in a raised position until the reversing valve is actuated to deliver the power stroke.

3. In a power shear having an upstanding reciprocating blade carrier, links depending from the ends of the blade carrier, a rotatable torsion rod having levers projecting from the ends thereof pivoted to said links, and twin double acting cylinders pivoted to the ends of the levers beyond the links for swinging the levers to rotate the torsion bar and raise and lower the links for reciprocating the blade carrier, the improvement of a hydraulic circuit for operating said twin cylinders having conduits communicating with the tops and bottoms of the cylinders, a pump for flowing fluid through the conduits to raise and lower the pistons in the cylinders, a reversing valve controlling the direction of flow through the conduits, an accumulator maintaining fluid in the bottoms of the cylinders, an unloading valve for recirculating fluid from the pump whenever fluid pressure in the accumulator exceeds a predetermined maximum, and a relief valve for the pump in advance of the unloading valve to dump pump pressure when the blade carrier reaches the bottom of its stroke, whereby the blade carrier will be urged to a raised position by accumulator pressure and will be forced downwardly through a power stroke only when the reversing valve delivers fluid to the tops of the cylinders.

4. The fluid drive of claim 1, wherein said reversing valve is biased to one flow through position and is manually actuated to an opposite flow through position.

5. The fluid drive of claim 1, wherein the accumulator accepts fluid flow at pressures above its setting to deliver the fluid when needed.

6. The fluid drive of claim 1, wherein the pump is a fixed displacement pump, the accumulator maintains a back pressure of about 500 pounds per square inch, and the relief valve is set to open at pressures above 2,000 pounds per square inch.

7. The machine tool of claim 2, wherein the reversing valve is biased to one flow through position and is manually actuated against the bias to a second flow through position, whereby fluid will flow through the valve under all operating conditions.

8. The machine tool of claim 2, including a check valve in the hydraulic circuit preventing back flow from the accumulator to the pump.

9. The machine tool of claim 2, wherein the twin cylinder actuated member is an upstanding reciprocating member held in a raised position until the reversing valve is manually actuated.

10. The power shear of claim 3, including a check valve stopping flow from the accumulator to the pump and effective to maintain accumulator pressure under the pistons.

11. The power shear of claim 3, including switches tripped by the blade carrier at the top and bottom of its stroke controlling the reversing valve to determine the length of the blade carrier stroke.

12. The fluid drive of claim 1, including an electrical circuit actuating said reversing valve to reverse the direction of flow of fluid through the conduit before the piston impacts against the opposite ends of the cylinder.

13. The fluid drive of claim 1, including an electrical control circuit actuating the reversing valve against the biasing means and having trip switches alternately opened and closed before the piston impacts against the ends of the cylinder to reverse fluid flow.

14. The machine tool of claim 2, including an electrical circuit energized through said manually actuated means for shifting the reversing valve and having trip switches activated by the twin cylinder actuated member at the top and bottom of its stroke to prevent the pistons from impacting against the ends of the cylinders.

15. The machine tool of claim 14, including a relay in the circuit effective to cycle the member through a plurality of strokes until the manually actuated member is released.

* * * * *